April 16, 1963 — G. D. CARPENTER — 3,085,613
PLASTIC NUT RETAINED BY A WASHER RECEIVED
IN AN EXTERIOR ANNULAR GROOVE
Filed Aug. 3, 1959

INVENTOR.
GARDINER D. CARPENTER
BY Whittemore
Hulbert & Belknap
ATTORNEYS

United States Patent Office 3,085,613
Patented Apr. 16, 1963

3,085,613
PLASTIC NUT RETAINED BY A WASHER
RECEIVED IN AN EXTERIOR ANNULAR
GROOVE
Gardner D. Carpenter, Mount Clemens, Mich., assignor to The McLaughlin Company, Birmingham, Mich., a corporation of Michigan
Filed Aug. 3, 1959, Ser. No. 831,233
1 Claim. (Cl. 151—41.72)

This invention relates to fastening devices and refers more particularly to a nut and washer assembly adapted to be locked in position around the periphery of an opening in a supporting member on assembly of a screw with said nut.

In the manufacture of automobiles and similar articles wherein it is desired to attach articles to relatively thin sheets of metal by means of screws or the like it is often necessary to provide means secured to the metal around openings therein to provide rigid support for the screws and prevent their pulling out of the metal. In the past nuts welded or similarly secured to the metal and threaded inserts having radial flanges on opposite sides of the metal have often provided such means. These nuts, inserts and similar devices have been generally unsatisfactory in that they often require a separate operation for attachment to the metal or they are complicated and unsuited to mass production techniques.

Therefore it is one of the obejcts of the present invention to provide an improved fastening device for attachment to a thin metal member around the periphery of an opening therein including means for locking said fastening device in place.

Another object is to provide improved fastening means for attachment to a thin metal member around the periphery of an opening therein including a nut type insert having a radially extending flange and a washer engageable with said insert for locking the insert within said opening.

Another object is to provide improved fastening means for attachment to a thin metal member around the periphery of an opening therein including a headed hollow insert adapted to be placed in said opening from one side thereof with the head engaging one side of said metal member, said insert having a portion extending through said member and beyond the other side thereof, and further including a washer engageable with said portion of said insert and said other side of said member to lock said insert in place.

More specifically another object is to provide an improved fastening device for attachment to a thin metal member around the periphery of an opening therein including a headed hollow insert adapted to be placed in said opening from one side thereof with the head engaging said one side of said metal member and having a portion extending through said member with a circumferential groove around the outer surface thereof and an axially slotted radially inwardly converging end, said fastening device also including an annular washer adapted to sleeve over said converging end into said annular groove to retain said insert in position within said opening, said washer and insert being locked in place on threading of a screw through said insert to expand said converging end.

Another object is to provide an improved fastening device for attachment to a thin metal stamping around the periphery of an opening therein including a nut type insert and locking washer which may be fed into a progressive die making the stamping whereby the complete assembly of the stamping and fastening means may be produced in one operation.

Another purpose of the invention is to provide an improved fastening device for attachment to a thin metal member around the periphery of an opening therein which is simple in construction, economical to produce and efficient in use.

Other objects and features of the invention will become apparent as the description proceeds, especially when taken in conjunction with the accompanying drawings, illustrating a preferred embodiment of the invention, wherein.

Figure 1:
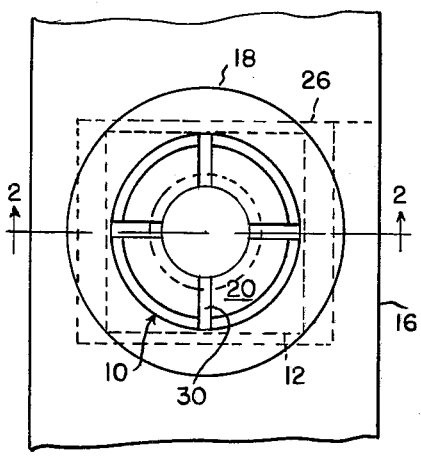
FIGURE 1 is a plan view of a thin metal member having attached thereto a fastening device according to the present invention.

With reference to the drawing a particular embodiment of the fastening device of the invention will now be described.

The fastening device of the invention is particularly adapted to provide means by which articles (not shown) may be fastened to thin metal members 16 through the use of standard bolts or screws 24. To this end a nut 10 having a rectangular portion 12 on the outer surface thereof near one end 11 is inserted within a similar rectangular opening 14 in the thin metal member 16 and a washer 18 is sleeved over the slotted and radially converging end 20 of the nut into the groove 22 therearound to retain the nut within the opening 14. With the nut formed as shown the washer 18 and nut 10 will be locked in position relative to each other within the opening 14 on the threading of a screw 24 through the nut 10 as shown in FIGURE 3 in a manner to be subsequently described.

Figure 2:
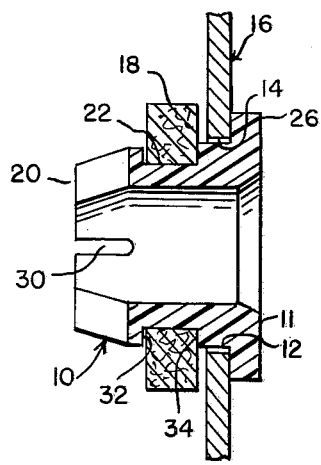
FIGURE 2 is a section through the thin metal member and fastening device illustrated in FIGURE 1 taken on the line 2—2 in FIGURE 1.

More specifically the nut 10 as shown best in FIGURE 2 comprises a molded nylon member having a rectangular radially extending flange 26 at end 11 thereof and a rectangularly shaped exterior surface 12 between the radially extending flange and a circumferential groove 22 which is produced in the outer surface thereof as shown. The other end 20 of the nut 10 as shown is provided with axially extending longitudinal slots 30 therein and converges radially inwardly. The rectangular surface 12 serves in conjunction with the rectangular opening 14 in the member 16 to prevent rotation of the nut on engagement of the screw 24 therewith. The groove 22 is provided to retain the washer 18 on the nut 10 to prevent withdrawal of the nut from the opening 14 as will later be explained. Slots 30 and the converging end 20 are provided on the nut 10 to facilitate the insertion of the washer on the nut and to provide for locking of the washer in place on the nut due to threading of the screw 24 into the nut 10 as illustrated in FIGURE 3.

Figure 3:
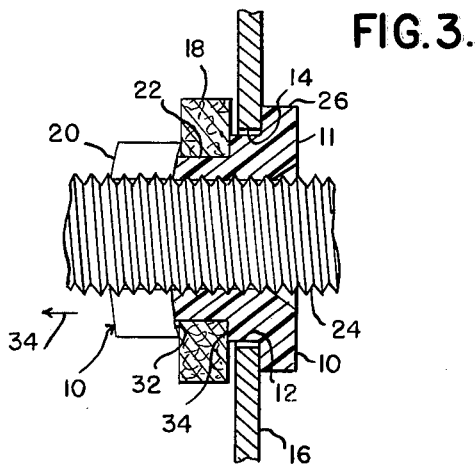
FIGURE 3 is a sectional view similar to that of FIGURE 2 and illustrating the action of the fastening device of the invention on threading a screw therethrough.

Washer 18 as shown best in FIGURES 2 and 3 is provided on nut 10 as previously indicated to prevent withdrawal of the nut 10 from the opening 14 in the member 16. The washer 18 is adapted to be sleeved over the end 20 of the nut 10 and to seat in groove 22 therein. Washer 18 is locked in position in groove 22 by being pressed between the sides 32 and 34 of the groove 22 on radial outward movement of the end 20 of the nut 10 due to threading of a screw 24 therethrough.

The washer 18 in one modification is of fibrous material. However it is contemplated that the washer may be made of metal, plastic or other similar material. Nut 10 in a preferred embodiment is of molded nylon plastic. With the use of such material the nut 10 is self threading as a screw is passed therethrough. Other material such as metals which may be threaded or be self threading are however contemplated for production of the nuts 10.

In use as will be evident from FIGURE 2 the opening 14 rectangular in shape is produced in the member 16, the insert or nut 26 having the rectangular outer surface 12 and flange 26 is inserted within the opening 14 and a washer 18 is sleeved over the end 20 of the nut 10 to retain the nut in the opening 14. A screw or bolt 24 which may be used for attaching an article (not shown) to the member 16 is then threaded through the nut 10 in the direction indicated by the arrow 34 in FIGURE 3. Thus the end 20 of the nut 10 is forced radially outward and the sides 32 and 34 of the groove 22 in the nut 10 firmly lock the washer 18 to the nut 10 in assembly with the member 16 whereby the screw 24 and the article held thereby is firmly attached to the member 16.

While a particular modification of the invention has been disclosed above other modifications of the invention will be apparent to those skilled in the art. For example the slots 30 in the end of the nut 20 may be omitted without materially reducing the effectiveness of the fastening device. Therefore applicant wishes to include within the scope of his patent all such modifications as may be suggested by the disclosed invention.

The drawings and the foregoing specification constitute a description of the improved fastening device in such full, clear, concise and exact terms as to enable any person skilled in the art to practice the invention, the scope of which is indicated by the appended claim.

What I claim as my invention is:

In combination a supporting member having a pair of substantially parallel sides and a non-circular opening therethrough extending between the parallel sides, a plastic self-threading nut extending through said opening having a smooth non-threaded bore therethrough and exterior dimensions smaller than the dimensions of the opening which dimensions permit lateral movement of the nut within the opening, a radially outwardly extending flange on one end of the nut for preventing movement of the nut completely through the opening, said nut including a non-circular portion immediately adjacent said flange complementary to the non-circular portion of the opening through the supporting member for preventing relative rotation of the nut and supporting member, said nut also including a centrally located annular groove extending therearound having spaced apart radially extending annular side walls, a flat washer the inner periphery of which is positioned within the annular groove, said annular groove being in spaced relation with respect to said flange a distance greater than the distance between the parallel walls of the supporting member for spacing the flat washer from the supporting member with the washer secured in the annular groove and thereby permitting axial movement of the nut within the opening; the other end of the nut being tapered beyond the washer radially inwardly axially outwardly both internally and externally to provide a complete tapered other end configuration and having axial slots therein extending substantially to the annular groove in said nut for causing movement of the radially extending side wall of the annular groove closest said other end of the nut toward the washer positioned in the annular groove on threading of a screw through the nut for applying a substantially axially extending clamping force around the inner periphery of the washer within the annular groove to secure the washer in the annular groove and lock the nut to the supporting member while permitting both transverse and axial relative movement therebetween.

References Cited in the file of this patent

UNITED STATES PATENTS

| | | |
|---|---|---|
| 1,584,563 | Kuykendall | May 11, 1926 |
| 1,646,367 | Carr | Oct. 18, 1927 |
| 2,333,277 | Swank | Nov. 2, 1943 |
| 2,616,328 | Kingsmore | Nov. 4, 1952 |
| 2,649,884 | Westover | Aug. 25, 1953 |
| 2,672,659 | Becker | Mar. 23, 1954 |
| 2,788,047 | Rapata | Apr. 9, 1957 |
| 2,862,537 | Poupitch | Dec. 2, 1958 |
| 2,866,372 | Fisher | Dec. 30, 1958 |